(12) United States Patent
Hassan et al.

(10) Patent No.: US 11,930,091 B2
(45) Date of Patent: Mar. 12, 2024

(54) LIST-BASED REDUNDANCY CONTROL IN CROWD-BASED IOT

(71) Applicant: Orange, Issy-les-Moulineaux (FR)

(72) Inventors: Ayman Hassan, Cairo (EG); Apostolos Kountouris, Chatillon (FR)

(73) Assignee: Orange

(*) Notice: Subject to any disclaimer, the term of this patent is extended or adjusted under 35 U.S.C. 154(b) by 77 days.

(21) Appl. No.: 17/607,840

(22) PCT Filed: Apr. 29, 2020

(86) PCT No.: PCT/EP2020/061845
§ 371 (c)(1),
(2) Date: Oct. 29, 2021

(87) PCT Pub. No.: WO2020/221787
PCT Pub. Date: Nov. 5, 2020

(65) Prior Publication Data
US 2022/0217219 A1    Jul. 7, 2022

(30) Foreign Application Priority Data

Apr. 30, 2019   (EP) ..................................... 19305559

(51) Int. Cl.
*H04L 67/564* (2022.01)
*G16Y 30/00* (2020.01)
(Continued)

(52) U.S. Cl.
CPC ............ *H04L 67/564* (2022.05); *G16Y 30/00* (2020.01); *G16Y 40/10* (2020.01); *H04L 67/12* (2013.01);
(Continued)

(58) Field of Classification Search
CPC ...... H04W 4/08; H04W 84/18; H04L 67/1095
See application file for complete search history.

(56) References Cited

U.S. PATENT DOCUMENTS

| 2003/0009587 A1* | 1/2003 | Harrow ................. H04L 67/101 709/238 |
| 2004/0249590 A1* | 12/2004 | Ota ......................... H04Q 9/02 702/79 |

(Continued)

FOREIGN PATENT DOCUMENTS

EP    2 829 849 A1    1/2015

OTHER PUBLICATIONS

International Search Report for International Application No. PCT/EP2020/061845 dated Jul. 28, 2020.

*Primary Examiner* — Kevin T Bates
*Assistant Examiner* — Emad Siddiqi
(74) *Attorney, Agent, or Firm* — Knobbe, Martens, Olson & Bear, LLP

(57) ABSTRACT

A method for redundancy control is disclosed. CIoT reader devices act as collaborative IoT gateways for connected objects and collect received data from the connected objects and transmit the data to a backend cloud infrastructure. The method includes assigning to each connected object an identifier ID and a freshness indicator, where the freshness indicator is a label having a value of "fresh" or "expired", upon receiving data from at least one connected object, setting the freshness indicator to "fresh" for each respective connected object, wherein for each connected object the freshness indicator is configured to change to "expired" after a pre-determined period of time, and sending a message to coordinator device, the message containing a fresh list of ID's of connected objects for which the freshness indicator has "fresh", wherein the coordinator device broadcasts the fresh list to CIoT reader devices within a broadcasting range of the coordinator device.

13 Claims, 4 Drawing Sheets

(51) Int. Cl.
*G16Y 40/10* (2020.01)
*H04L 67/12* (2022.01)
*H04L 67/289* (2022.01)
*H04L 67/5651* (2022.01)

(52) U.S. Cl.
CPC ........ *H04L 67/289* (2013.01); *H04L 67/5651* (2022.05)

(56) References Cited

U.S. PATENT DOCUMENTS

| | | | |
|---|---|---|---|
| 2018/0109941 A1 | 4/2018 | Jain et al. | |
| 2018/0357556 A1* | 12/2018 | Rai | G06N 20/00 |
| 2018/0373756 A1* | 12/2018 | Madala | G06F 16/24534 |
| 2020/0336541 A1* | 10/2020 | Naderi Alizadeh | H04L 67/01 |

* cited by examiner

LIST-BASED REDUNDANCY CONTROL IN CROWD-BASED IOT

CROSS-REFERENCE TO RELATED APPLICATIONS

This application is filed under 35 U.S.C. § 371 as the U.S. National Phase of Application No. PCT/EP2020/061845 entitled "LIST-BASED REDUNDANCY CONTROL IN CROWD-BASED IOT" and filed Apr. 29, 2020, and which claims priority to EP 19305559.7 filed Apr. 29, 2019, each of which is incorporated by reference in its entirety.

BACKGROUND

Field

The instant disclosure relates to methods, systems and associated devices for redundancy control in decentralized crowd-based data collection network architecture.

Description of the Related Technology

In particular, the instant disclosure is related to redundancy control in decentralized crowd-based data collection network architecture, where a crowd of user equipment act as collaborative IoT (CIoT) gateways for a number of connected objects, such as sensors, beacons, etc. Examples of user equipment acting as CIoT gateways are smartphones, wife gateways and other similar devices capable of transmitting and receiving data. In the following, the crowd of user equipment of collecting data in a CIoT architecture will be referred to as "CIoT reader devices".

The CIoT does not require any infrastructure besides ordinary cellular data network to enable IOT data exchange between the connected objects and the cloud infrastructure. CIOT hence operates at Over-The-Top mode meaning that the only backbone requirement is access to mobile internet and the application layer of user equipment (such as smartphones) and not access to a specific cellular infrastructure and protocols.

CIOT is a low-cost enabler for enriching IOT services in areas with no dedicated IOT infrastructure (e.g., LORA and SIGFOX), or with poor coverage and dense areas. CIOT reduces energy requirements on sensor nodes as ultra-low power radio is used. CIOT is very promising in applications that now depend of fixed infrastructure and are delay-tolerant such as smart metering, environment sensing and healthcare.

On the other hand, given its decentralized (i.e., distributed) nature, CIOT has several inherent limitations and drawbacks as a model for IoT. Among major limitations is the amount of redundancy in data sent to the cloud infrastructure. Since it is very likely that one and the same of the plurality of the connected objects is read by many uncoordinated CIOT reader devices, several copies of the same data are sent to the backend cloud infrastructure by many CIoT reader devices. Therefore, CIOT model results in high degree of data redundancy and decreases cellular network efficiency. Common schemes to lower the amount of redundancy include probabilistic transmission model and server handshaking.

In probabilistic transmission mode, each CIOT reader device performs a Bernoulli trial with a success rate "p". Only if the trial yields success, the reading is sent. The scheme reduces redundancy depending on "p" but doesn't reduce redundancy to zero. Furthermore, for small values of "p" and a small number of active CIoT reader devices in range, dropped-packet probability increases, leading to the loss of some sensor data.

The server handshaking involves communication with the backend cloud infrastructure before sending readings of the CIoT reader devices, in order to check for the availability of readings from other CIoT reader devices. However, the signalling overhead of handshaking could be equal to or greater than the amount of data itself, especially for short dwelling times and short data packet size.

The instant disclosure has notably for object to mitigate those drawbacks and to address the necessity of optimizing the amount of data transmitted between the CIoT reader devices and the backend cloud infrastructure. More particularly, a technical advantage of the present disclosure is that the amount of redundant data, which are transmitted from a number of CIoT reader devices to the backend cloud infrastructure in two or more copies, is reduced to the smallest possible value.

SUMMARY

To this aim, according to the disclosure, there is provided a method for redundancy control in decentralized crowd-based data collection network architecture, where a crowd of user equipment, termed "CIoT reader devices", act as collaborative IoT gateways for connected objects and collect received data from said connected objects and transmit at least some of said data to a backend cloud infrastructure, the method, implemented by a computer circuit of the backend cloud infrastructure, comprising: (a) assigning to each connected object an identifier ID and a freshness indicator, where the freshness indicator is a label having a value selected from one of "fresh" or "expired", (b) upon receiving data from at least one connected object, (c) setting the freshness indicator to the value of "fresh" for each respective connected object, wherein for each connected object the freshness indicator is configured to change its value to "expired" after expiry of a pre-determined period of time, and (d) sending a message to at least one coordinator device, said message containing a list of ID's of at least one connected object for which the freshness indicator has the value of "fresh", termed "fresh list", wherein said coordinator device is configured to broadcast the fresh list to CIoT reader devices within a broadcasting range of said coordinator device, and wherein the CIoT reader devices are configured to exclude data from any connected object whose ID is appearing in the fresh list from being transmitted to the backend cloud infrastructure.

With these features, the backend cloud infrastructure advantageously receives information indicating that the data received from a given one of the number of connected objects is recent (fresh) and that there is no immediate need to re-send the data from that given one of the number of connected objects by another CIoT reader device.

Therefore, in contrast to the server handshaking approach the amount of data exchanged between the CIoT reader devices and the backend cloud infrastructure is reduced to data associated with the fresh list and a single copy of data acquired by the connected objects. The method ultimately leads to a situation where almost no data from any connected object is received twice or even more times by the backend cloud infrastructure. This is achieved at the cost of simply sending a list of identifier ID's of those of the connected objects for which the data have been received quite recently and thus are still fresh. Since the fresh list does not represent a considerable amount of data and since there is only need to send the fresh list once, the amount of redundant data is effectively minimized to acceptable levels. Even when the fresh list is sent repeatedly to the selected coordinator devices, the amount of data is still much lower compered to situation where there occurs constant communication between each CIoT reader device and the backend cloud infrastructure, as it is the case in the handshaking strategy explained in the background section.

Accordingly, the disclosure ensures that the backend cloud infrastructure determines whether data from a particular connected object is fresh and further ensures that each CIoT reader device is informed about the fact that there is no need to resend data for a particular connected object in the immediate future. As a result, redundant data is optimized to a minimum amount. Consequently, the user equipment in the CIoT network is much better coordinated and the efficiency of the corresponding cellular network is not decreased due to data overload.

In some embodiments, one might also use one or more of the following features:

- assigning to each connected object a numerical value representing an initial value of a down-counter,
  - upon receiving data from at least one connected object, initializing and triggering the down-counter of each respective connected object, and
  - sending a message to at least one coordinator device, said message containing a list of ID's of at least one connected object for which the down-counter (VP) has not yet counted down to zero
- the method further comprises sending instructions to each CIoT reader device to perform a Bernoulli trial with a predetermined success rate, and to send data collected from a connected object to the backend cloud infrastructure only if the outcome of the respective Bernoulli trial yields a positive result for the connected object (this allows to further reduce redundant transmissions related to connected objects, which are not appearing in the fresh list; implementing the Bernoulli trial may be advantageous when there is a need to cope with differences in the density of CIoT reader devices in different areas or at different times of the day, which may be done by setting an appropriate value of the success rate of the Bernoulli trial);
- the method further comprises defining a redundancy level corresponding to a numerically expressed amount of redundant data received by the backend cloud infrastructure, upon determining that the amount of the redundant data has exceeded the redundancy level, identifying one or more of the connected objects as being the source of the redundant data, and identifying one or more of the CIoT reader devices which transmitted the redundant data from the identified connected objects to the backend cloud infrastructure (monitoring the amount of redundant data to keep tract of the efficiency of the data redundancy control; also it enables to ensure that in certain situations some redundancy of data is maintained, since the controlled data redundancy is used for example when localizing the CIoT reader devices; for example when same data is collected by for example three CIoT reader devices situated at different locations, this may be used to estimate locations of the CIoT reader devices);
- a plurality of coordinator devices is provided, and the method further comprises: receiving a location of each connected object, generating a list of connected objects pertaining to a selected area, receiving a list of coordinator devices located in the selected area, identifying for each coordinator device a portion of the selected area covered by the respective coordinator device based on the broadcasting range of the respective coordinator device, and determining a combination of coordinator devices which cover the largest portion of the selected area (these features optimize utilization of coordinator devices and enable to achieve better area coverage and better efficiency in distributing the fresh list to the coordinator devices);
- a plurality of coordinator devices is provided, and the method further comprises: receiving a location of each connected object, and receiving a list of each coordinator device, identifying for each coordinator device a number of connected objects located within a broadcasting range of the respective coordinator device (these features serve as alternative to those of the previous paragraph and are also directed to optimize utilization of coordinator devices, having similar advantages and technical effects);
- each coordinator device is positioned on a stationary cell site, and the method further comprises generating a number of messages, said number of messages being equal to the number of coordinator devices communicating with the backend cloud infrastructure, wherein each message is associated to a selected one coordinator device, and wherein each of said messages contains one separate fresh list of ID's of connected objects located within the broadcasting range of the associated coordinator device, and sending the number of messages to the respective coordinator devices (using the stationary cell site geographical organization permits managing the coordinator devices through the cellular network infrastructure, which brings for example an additional opportunity to implement the coordination process as a TELCO service);
- the method further comprises: sending a message to each coordinator device, said message containing a fresh list of ID's of all connected objects for which the down-counter has not yet counted down to zero, wherein the message to each coordinator device is preferably sent periodically (it may be preferable, especially in areas with higher density of CIoT reader devices to distribute the fresh list to all available coordinator device and thus optimize the process of the data redundancy control; similarly, for the reasons of efficiency, it may desirable to set periodicity with which the fresh lists are distributed, especially when there is a need to control larger amount of data);
- the CIoT reader device is at least one of a smartphone and a wifi gateway;
- the at least one coordinator device is chosen among the CIoT reader devices;
- the initial value of the down-counter is different for at least two connected objects, or is different for each connected object, wherein the initial value of the down-counter is selected according to a type of payload data or delay tolerance of the connected object as defined by the backend cloud infrastructure (for example a temperature environmental sensor has different requirements in terms of update frequency and needs to be updated about 4 times a day, i.e., every 8 hours, while for example a parking spot occupancy detector sensor needs to be updated about 4 times per hour, i.e., every 30 minutes; the value of the down-counter, corresponding to the validity period of the data from the sensor, and corresponding to a period after which it is required to update data from the sensor, is thus set differently for a temperature environmental sensor—for which the initial value of the down-counter could be 8 hours—and for a parking spot occupancy detector sensor—for which the initial value of the down counter could be 30 minutes).

In accordance with the disclosure, the above described method is implemented in a backend cloud infrastructure comprising a computer circuit for implementing said method in the above defined manner.

Further, a computer program is provided comprising instructions for performing the method as defined above, when these instructions are run by a processor.

Furthermore, there is provided a system for redundancy control in decentralized crowd-based data collection network architecture, where a crowd of user equipment, termed "CIoT reader devices", act as collaborative IoT gateways for connected objects and collect received data from said connected objects and transmit said data to a backend cloud infrastructure, wherein the backend cloud infrastructure comprises a computer circuit configured to: (a) assign to each connected object an identifier ID and a freshness indicator, where the freshness indicator is a label having a value selected from one of "fresh" or "expired", (b) upon receiving data from at least one connected object, setting the freshness indicator to the value of "fresh" for each respective connected object, wherein for each connected object the freshness indicator is configured to change its value to "expired" after expiry of a pre-determined period of time, and (c) send a message to at least one coordinator device, said message containing a fresh list of ID's of at least one connected object for which the freshness indicator has the value of "fresh", wherein said coordinator device is configured to broadcast the fresh list to CIoT reader devices within a broadcasting range of said coordinator device, and wherein the CIoT reader devices are configured to exclude data from any connected object whose ID is appearing in the fresh list from being transmitted to the backend cloud infrastructure.

To implement the above method and system a coordinator device of the above system is provided, for performing the method as defined above. Said coordinator device comprises a processing circuit configured to: receive the fresh list from the backend cloud infrastructure, and broadcast the fresh list to an area defined by the broadcasting range of said coordinator device.

Further, to implement the above method and system a user equipment acting as collaborative IoT reader device in said system is provided for performing the method as defined above. The user equipment comprises a processing circuit configured to: receive the fresh list from the coordinator device, read the identifier ID's of the connected objects included in the fresh list, and exclude the data received from the connected objects contained in the fresh list from being transmitted to the backend cloud infrastructure.

BRIEF DESCRIPTION OF THE DRAWINGS

Other characteristics and advantages of the disclosure will readily appear from the following description of one of its embodiments, provided as a non-limitative examples, and of the accompanying drawings.

On the drawings.

On the different Figures, the same reference signs designate like or similar elements.

DETAILED DESCRIPTION OF CERTAIN ILLUSTRATIVE EMBODIMENTS

Figure 1:
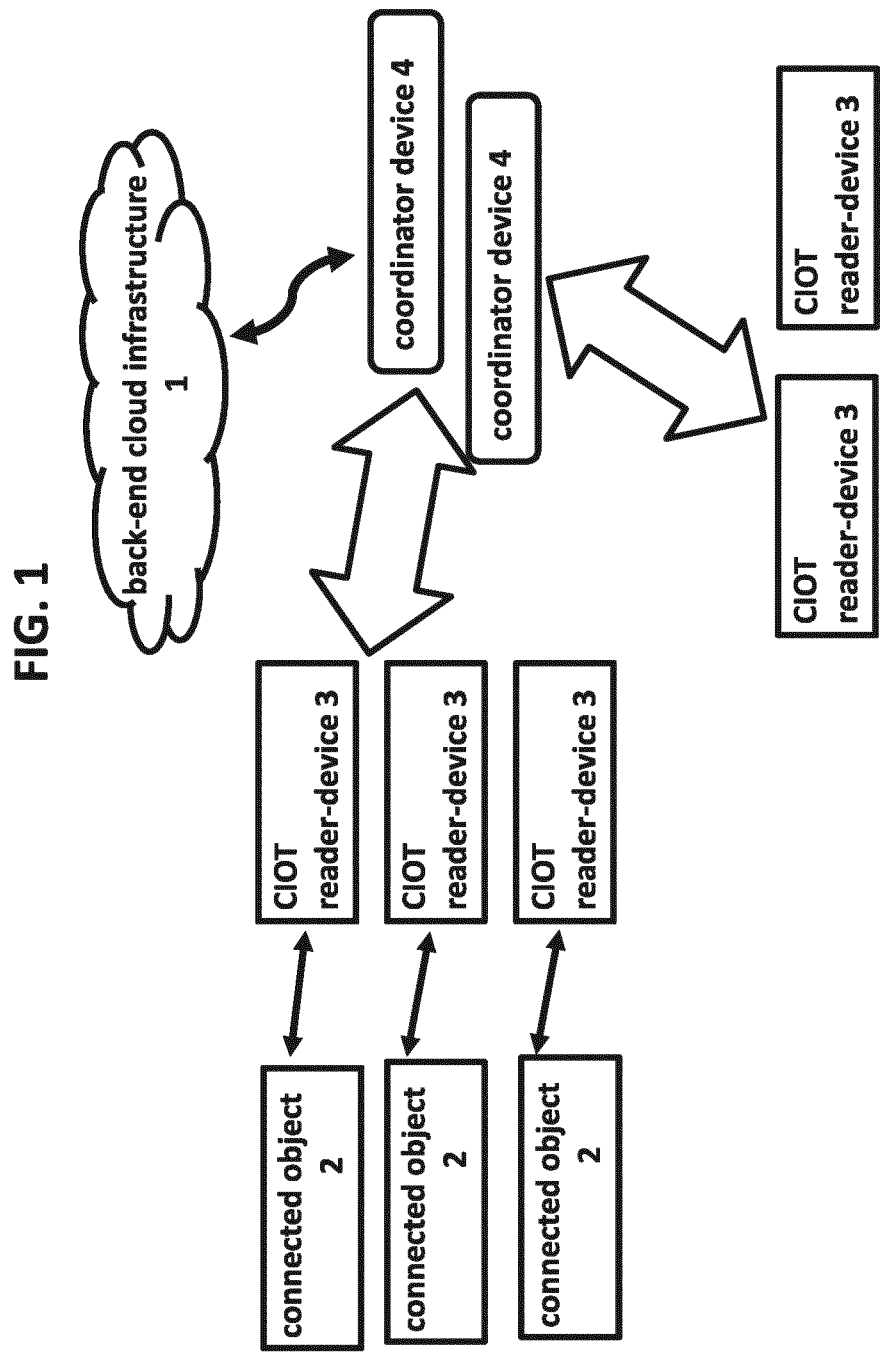
FIG. 1 is an overview of a CIoT networking based on a list-based broadcast scheme for local coordination.

FIG. 1 illustrates an overview of a CIoT networking based on a list-based broadcast scheme for local coordination. The list-based broadcast scheme refers to the fact that the associated method and system are based on generating and broadcasting a so called fresh list from the backend cloud infrastructure 1 to coordinator devices 4. The method and system based on such a fresh list then ensure improved redundancy control in decentralized crowd-based data collection network architecture, where a crowd of user equipment 3, termed "CIoT reader devices" 3, act as collaborative IoT gateways for connected objects 2 and collect received data from said connected objects 2 and transmit said data to a backend cloud infrastructure 1.

As illustrated in FIG. 1, the list-based broadcast scheme comprises a backend cloud infrastructure 1, connected objects 2, user equipment referred to as CIoT reader devices 3, and at least one coordinator device 4. In one example, the backend cloud infrastructure 1 can be built based on a LiveObject infrastructure using its Application Programming Interface and protocols. Examples of connected objects 2 are IoT devices such as beacons, smart meters, environmental sensors, telemetry devices, automation sensors in buildings, smart city infrastructure sensors, parking space sensor. Many other similar devices can be considered as connected objects 2 for the purposes of the present disclosure. Examples of CIoT reader devices 3 are smartphones or wifi gateways, but other possible devices enabling the below explained functionality are also contemplated. Examples of coordinator devices 4 are the same as examples of the CIoT reader devices 3, since the coordinator devices 4 are devices selected from the CIoT reader devices 3 and having a special functionality, which other CIoT reader devices 3 might not necessarily have. Alternatively, all the CIoT reader devices 3 in the system and method according to the disclosure may already be preconfigured to act as coordinator devices 4. The device to act as coordinator device 4 may be predetermined ad-hoc or in a round robin manner among CIoT reader devices within the same area. Alternatively, a coordinator device 4 can be a fixed beacon with cellular connectivity, and be configured to obtain a fresh list from the backend cloud infrastructure and to distribute the fresh list to CIoT reader devices located within the broadcasting range of the coordinator device 4. A smartphone, as a typical example of a CIoT reader device 3, can be directly equipped with an application having reader-device functionality based on Bluetooth Low Energy (BLE). Smartphones which do not have such a functionality preconfigured may still act as CIoT reader devices 3 by downloading a special application from an application store, for example.

As further illustrated in FIG. 1, the general scheme of the list-based broadcast architecture is such that the backend cloud infrastructure 1 exchanges data at least with the coordinator devices 4 while the coordinator devices 4 exchange data with CIoT reader devices 3. Further, the CIoT reader devices 3 are configured to communicate with the plurality of connected objects 2. The backend cloud infrastructure 1 can further be configured to exchange data with, and/or sending instructions to, the CIoT reader devices 3. As mentioned, the CIoT reader devices 3 and the coordinator devices 4 are selected from the same group/type of devices. The backend cloud infrastructure 1 communicates with both the CIoT reader devices 3 and the coordinator devices 4 for example via a cellular network, and/or wifi internet connection. The backend cloud infrastructure is generally not connected, i.e., not in communication with the connected objects 2. The connected objects are equipped with BLE modems to preserve their battery. The BLE is used by the connected objects 2 to send data to the CIoT reader devices 3. The BLE is also used to broadcast messages sent by coordinator devices 4, where these messages include fresh list(s) as described below, and where these messages are received by the CIoT reader devices 3 which are located in the vicinity, i.e., within the broadcasting range of the coordinator devices 4.

Figure 2:
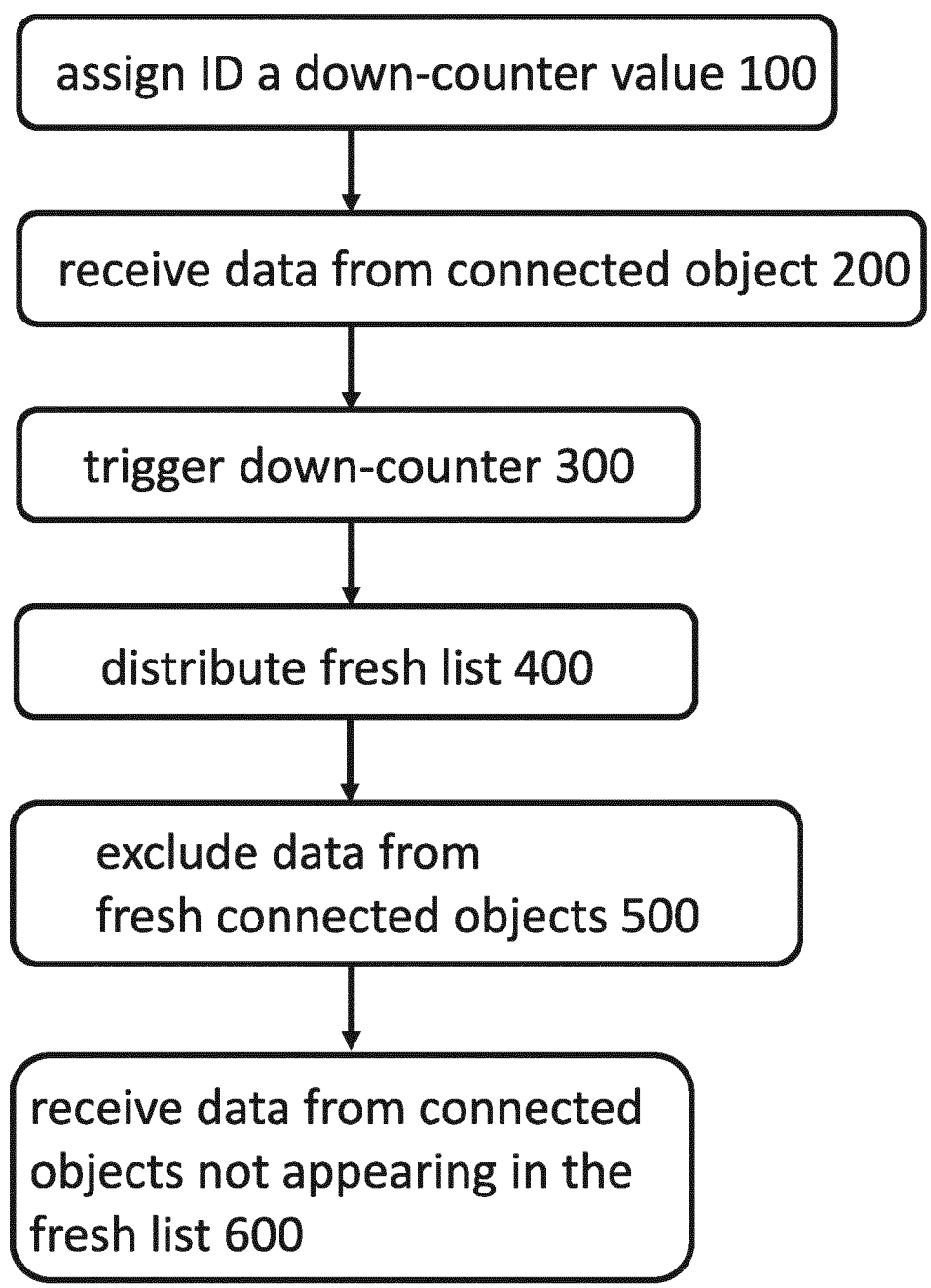
FIG. 2 is flowchart of the methods steps implemented in the disclosure.

The purpose of the local coordination scheme according to FIGS. 1, and 2 which is based on specific coordinator devices 4, is that the coordinator devices 4 broadcast in their vicinity data which is centrally collected by the backend cloud infrastructure, relating to a list of connected objects 2, where the data is broadcasted around the broadcasting coordinator-device's 4 location.

FIG. 2 illustrates the main steps implemented by the method based on the list-based broadcast scheme for reducing redundancy of transmitted data. The method in accordance with FIG. 2 is implemented by the backend cloud infrastructure 1. The first step, step 100, in said method is to assign to each connected object 2 an identifier ID and a freshness indicator. A list of identifier ID's can be stored for example in the database 5 of the backend cloud infrastructure 1. When a connected object 2 sends data to a CIoT reader device 3, the data also include the identifier ID. The identifier ID thus enables the backend cloud infrastructure 1 to recognize which connected object 2 gathered the received data. The data from each connected object 2 may also be stored in the database 5 of the backend cloud infrastructure 1. The freshness indicator can indicate one of two possible values at a time. One value of the freshness indicator is "fresh" and another value of the freshness indicator is "expired". For each respective connected object 2 the value of freshness indicator is set to "fresh" upon receiving data from the connected object 2. The data are thus fresh/non-expired at that point. After predetermined period of time the freshness indicator is configured to change its value to "expired", which indicates that the data are no longer fresh.

An example implementation of the freshness indicator could be a down-counter VP. In this exemplary implementation a numerical value representing an initial value of a down-counter VP is assigned to each connected object 2. The initial value of the down-counter VP can also be referred to as a validity period. The initial value of the down-counter can be expressed as non-negative integer number, representing for example a number of seconds, minutes, hours or other suitable time units during which the data of the corresponding connected object 2 will be considered fresh (or recent, non-expired, updated). The data are thus considered fresh for any non-zero value of the down-counter, and the data are considered expired as soon as the down-counter reaches zero. The value "fresh" of the freshness indicator thus corresponds to a non-zero value of the down-counter and the value "expired" of the freshness indicator corresponds to the down-counter being equal to zero.

The initial value of the freshness indicator can also be stored in the database 5 of the backend cloud infrastructure 1, and associated with an identifier ID of a corresponding connected object 2. Similarly, when the freshness indicator is implemented as down-counter, the initial value of the down-counter VP is stored in the database 5 of the backend cloud infrastructure 1, and associated with an identifier ID of a corresponding connected object 2. The initial value of the down-counter VP can be a constant number, not changing in time, or it can be variable. If the initial value of the down-counter VP for a particular connected object is changed, the new value may be communicated to the backend cloud infrastructure via a CIoT reader device 3 together with the data gathered by the connected object 2. The initial value of the down-counter may vary from one type of connected object 2 to another for example based on the type of payload data or delay-tolerance of the connected object 2.

In the following step of the method, in step 200, the backend cloud infrastructure receives data from at least one connected object 2, including the identifier ID of the connected object 2, and, where appropriate, an updated initial value of the freshness indicator, such as the down-counter VP.

The backend cloud infrastructure 1 then, in step 300, is configured to set the value of the freshness indicator to the value of "fresh" upon receiving data from the connected object 2. The freshness indicator will keep the "fresh" status for a predetermined period of time. For example, the predetermined period of time could be 3 hours in one implementation. This means that the data received from that particular connected object 2 will be considered fresh for 3 hours by the backend cloud infrastructure 1. After expiry of the predetermined period, the data are no longer be considered fresh and the status of the freshness indicator changes to "expired".

In the exemplary embodiment using the down-counter, the backend cloud infrastructure 1 initializes and triggers the down-counter VP of each respective connected object 2. Again, the initial value of the down-counter could be for example 3 hours. This means that the data received from that particular connected object 2 will be considered fresh for 3 hours by the backend cloud infrastructure 1, which initiates the down-counter VP immediately after receiving a packet with data from that particular connected object 2. While the data from the connected object 2 is considered fresh, the identifier ID of that particular connected object 2 is included in the fresh list, which is stored in, and regularly updated by, the backend cloud infrastructure. For example, the fresh list may be stored in the database 5 and be updated every time a new packet of data from any connected object (via a CIoT reader device 3) is received. As long as the data are considered fresh (freshness indicator equals to "fresh"), there is no need to resend data from that particular connected object. By this means, the amount of redundant data communicated among the devices can be considerably reduced if the CIoT reader devices 3 are informed which data from which connected object 2 are currently fresh and therefore do not have to be sent to the backend cloud infrastructure. This is achieved by distributing the fresh list according to the following step.

In the following step of the method, in step 400, the backend cloud infrastructure sends a message to at least one coordinator device 4, said message containing a fresh list of ID's of at least one connected object 2 for which the freshness indicator has the value of "fresh". In the exemplary implementation using the down-counter VP, the message contains a fresh list of ID's of at least one connected object 2 for which the down-counter VP has not yet counted down to zero.

Regarding the step 500 of the method of FIG. 2, the coordinator device 4 is configured to broadcast the fresh list to CIoT reader devices 3 within a broadcasting range of said coordinator device 4, and further to prompt the CIoT reader devices 3 to exclude data from any connected object 2, whose ID is appearing in the fresh list, from being transmitted to the backend cloud infrastructure 1 (i.e., for those connected objects for which the freshness indicator has the value of "fresh"). Preferably, the message with the fresh list is sent by the backend cloud infrastructure periodically in a regular predetermined interval, where this interval could be either constant or changed if desired.

Regarding the step 600 of the method of FIG. 2, it follows from the above steps that the backend cloud infrastructure no longer receives data from connected objects 2 whose data are considered fresh, i.e., from those connected objects 2 which are currently appearing in the fresh list (that is for which the freshness indicator has the value of "fresh"). Data from other connected objects 2, i.e., from those connected which are not appearing on the fresh list (that is for which the freshness indicator has the value of "expired") continue to be sent by the CIoT reader devices 3 to the backend cloud infrastructure 1.

The method of FIG. 2 significantly reduces the redundancy and ensures that the CIoT reader devices 3 send only data that needs to be processed at the backend cloud infrastructure 1. This ensures better battery usability at the CIoT reader devices 3, better cellular network bandwidth utilization, and less processing overheads of redundant data at the backend cloud infrastructure 1.

In addition to the method steps described above with regard to FIG. 2, the method may further comprise the step of sending instructions, by the backend cloud infrastructure 1, to each CIoT reader device 3 to perform a Bernoulli trial with a predetermined success rate, and to send data collected from each connected object 2 to the backend cloud infrastructure 1 only if the outcome of the respective Bernoulli trial yields to a positive result. The Bernoulli trial is performed by the CIoT reader device. The method based on Bernoulli trial leads to the fact that the data packets from the CIoT reader devices 3 are sent randomly (based on the random outcome of the Bernoulli trial). The success probability of the Bernoulli trial may be preconfigured in each CIoT reader device 3, and it may in some embodiments be changed by sending instructions from the backend cloud infrastructure 1. Implementing the use of Bernoulli trial, along with distributing fresh list(s) by the backend cloud infrastructure 1, permits to further reduce redundant transmissions pertaining to connected objects 2. Alternatively to receiving explicit instruction from the backend cloud infrastructure 1, the CIoT reader devices 3 may be pre-configured to perform the Bernoulli trial in a fully autonomous manner. However, even in such a case, the parameters of the Bernoulli trial (e.g., the value of the success rate) may still be affected by the backend cloud infrastructure 1.

In an embodiment, as the initial value of the down-counter VP associated with a specific connected object 2 counts down in the backend cloud infrastructure 1, the backend cloud infrastructure 1 may further be configured to determine an urgency index UI. The urgency index UI may be defined as an increasing function of the down-counting of the down-counter VP. For example, the urgency index UI may be assigned an initial value UI1, which increases linearly as the initial value of the down-counter decreases. The initial value UI1, may be either zero or a value close to zero. For example, the urgency index may lie in the interval between zero and unity, zero representing the lowest urgency and unity representing the highest urgency. Alternatively, other increasing functions for the urgency index other than linear are also possible. Further, in some embodiments, the urgency index UI may be configured to reach its final (highest) value UI2 (for example 1) at the end of the countdown of the down-counter VP (i.e., the urgency is the highest when the counter has counted down to zero), or the urgency index may be configured to reach its final value UI2 before the down-counter reaches zero, i.e., for example the final value UI2 is reached already when the down-counter reaches an approach value VPA, which is close to zero but not yet zero. After the value VPA is reached, the urgency index then remains at its highest value UI2 until the end of the countdown. It follows from the above that once a new fresh packet of data is received from a connected object 2 having the corresponding identifier ID associated with the respective down-counter VP (and the respective urgency index UI), the down-counter VP and the urgency index are reset to their initial values. Further, the value of the urgency index UI may be configured to start decreasing in time as soon as the end of the down-counting has been reached and the new fresh packet of data has not yet been received. This is because not receiving data from a connected object 2 associated with a high (or even the highest) urgency index likely indicates a malfunction in the connected object 2. Therefore, since after the count-down is completed the urgency index decreases back to its initial value it is ensured that the data are not continued to be requested from a likely malfunctioning connected object 2.

Figure 3:
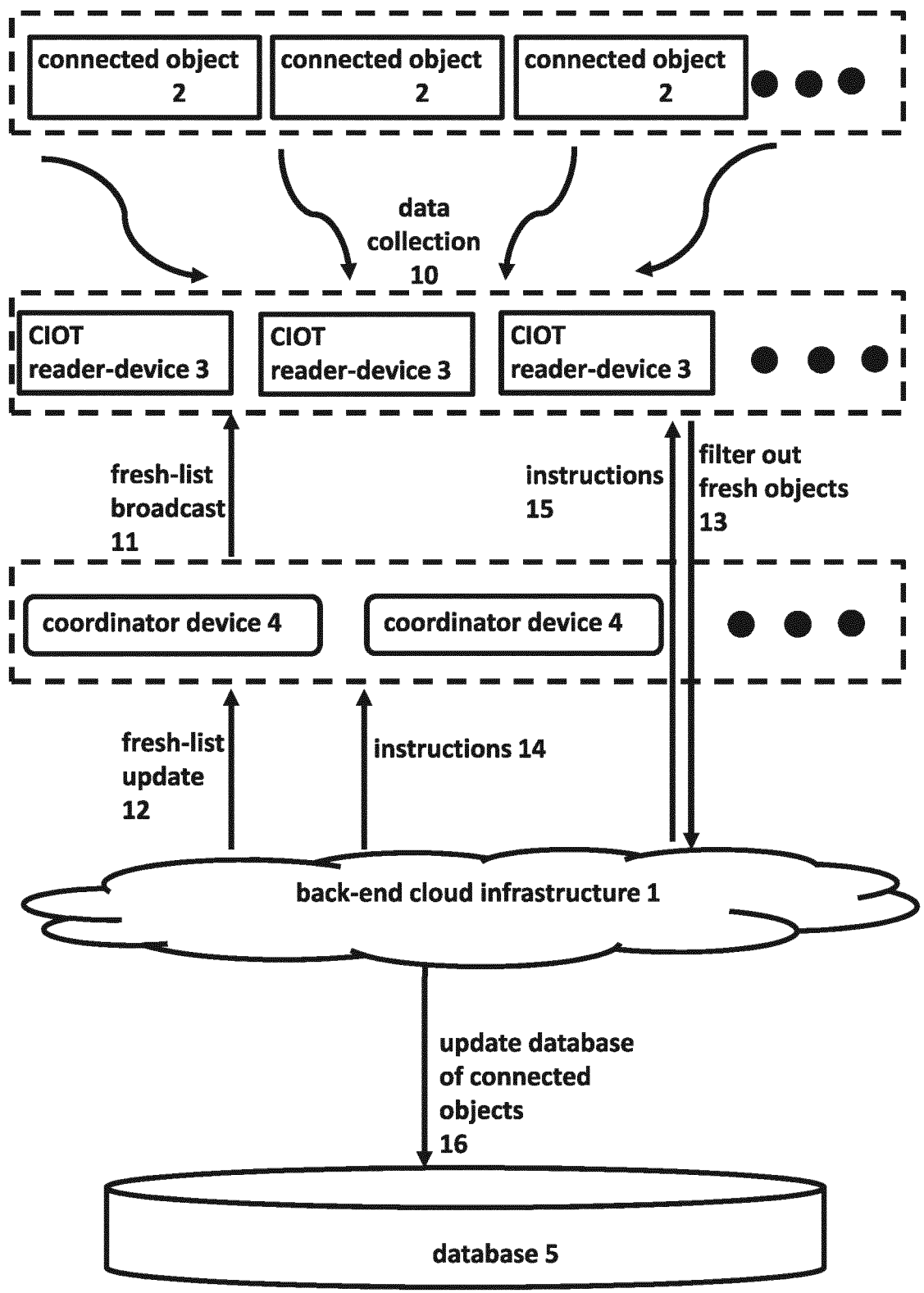
FIG. 3 is detailed overview of message exchanges between entities (connected objects, CIoT reader devices, coordinator devices, backend cloud infrastructure and its database) in the list-based broadcast scheme for local coordination.

FIG. 3 illustrates detailed overview of message exchanges between connected objects 2, CIoT reader devices, coordinator devices 4, backend cloud infrastructure 1 and its database 5 in the list-based broadcast scheme for local coordination of FIG. 2. The CIoT reader devices 3 gather data from connected objects 2 via BLE, illustrated as "data collection 10" in FIG. 3. The CIoT reader devices 3 are communicating with the backend cloud infrastructure 1 via a cellular or wifi internet connection. The coordinator devices 4 may communicate with the backend cloud infrastructure via the same channels as the CIoT reader devices 3.

The backend cloud infrastructure may include a database 5, or may be in communication with a database 5. Illustrated in FIG. 3 as "update database of connected objects 16", the backend cloud infrastructure may regularly update information and data related to the connected objects 2, such as their identifier IDs, all the data gathered/sensed by the connected objects, the initial values of the down-counter VP and/or the urgency index UI. The database may also store the fresh list. The fresh list is distributed by the backend cloud infrastructure to the coordinator devices 4 via the cellular or wifi connectivity, illustrated as "fresh-list update 12" in FIG. 3. The coordinator devices 4 then pass the fresh list further by broadcasting it in their vicinity defined by their broadcasting range via the BLE, illustrated as "fresh list broadcast 11" in FIG. 3. As the CIoT reader devices 3 receive the fresh list from the coordinator devices 4, they filter out fresh connected objects, illustrated as "filter out fresh objects 13" in FIG. 3 and are further configured to send only data to the backend cloud infrastructure 1 which are associated with connected objects 2 not appearing on the fresh list.

The backend cloud infrastructure 1 may additionally be configured to send "instructions 14" and "instructions 15" to the coordinator devices 4 and the CIoT reader devices 3 respectively. In an embodiment, the coordinator devices 4 and CIoT reader devices 3 may operate exclusively under direct instruction of the backend cloud infrastructure 1. Especially, the backend cloud infrastructure 1 may instruct said coordinator device to broadcast the fresh list to CIoT reader devices within a broadcasting range of said coordinator device, and further instruct the CIoT reader devices to exclude data from any connected object whose ID is appearing in the fresh list from being transmitted to the backend cloud infrastructure 1. Nevertheless, in an alternative embodiment, the coordinator devices 4 are pre-configured to broadcast the fresh list without direct instructions from the backend cloud infrastructure 1 in an autonomous manner. Similarly, the CIoT reader devices 3 are pre-configured to receive and process the fresh list from the backend cloud infrastructure 1 without receiving any further specific instructions thus also operating in an autonomous manner. The coordinator devices 4 and the CIoT reader devices 3 may also be configured to operate partially autonomously and partially based on the instructions received from the backend cloud infrastructure 1. Additionally, the backend cloud infrastructure 1 may send for example instructions 15 to the CIoT reader devices 3, where it determines a frequency with which the CIoT reader devices 3 will transmit data to the backend cloud infrastructure 1. For example, the backend cloud infrastructure 1 may determine a period P after which the CIoT reader devices 3 will iteratively send data to the backend cloud infrastructure 1. Also, the backend cloud infrastructure 1 may send for example instructions 14 to the coordinator devices 4, where it determines the interval I with which the coordinator devices 4 will broadcast the fresh list in their vicinity. The interval I of broadcasting the fresh list could be different for each coordinator device 4.

In general, a coordinator device 4 of the system of the disclosure for performing the above described method comprises a processing circuit configured to receive the fresh list from the backend cloud infrastructure 1 and to broadcast the fresh list to an area defined by the broadcasting range of said coordinator device 4.

The user equipment acting as collaborative IoT reader device 3 in the system of the disclosure for performing the above described method comprises a processing circuit configured to receive the fresh list from the coordinator device 4, to read the identifier ID's of the connected objects 2 included in the fresh list, and to exclude the data received from the connected objects 2 contained in the fresh list from being transmitted to the backend cloud infrastructure 1.

In an embodiment, a plurality of coordinator devices 4 is provided, and the list-based broadcast scheme according to the method of the disclosure further includes receiving a location of each connected object 2, generating a list of connected objects 2 pertaining to a selected area A, receiving a list of coordinator devices 4 located in the selected area A, identifying for each coordinator device 4 a portion of the selected area A covered by the respective coordinator device 4 based on the broadcasting range of the respective coordinator device 4, and determining a combination of coordinator devices 4 which cover the largest portion of the selected area.

The location of coordinator devices 4 and CIoT reader devices 3 can be tracked in the same fashion. Readings from the CIoT reader devices 3 may be geolocated (i.e., tagged with the location of the CIoT reader device 3 at the time of the reading from the connected object 2 is obtained). Geolocated readings are transferred to the backend cloud infrastructure 1, thus providing the backend cloud infrastructure 1 with the location information. From successive readings, it is possible to keep track of a CIoT reader device's location as it moves. The information related to location of the coordinator devices 4 and/or CIoT reader devices may be stored by the backend cloud infrastructure 1, for example in a database 5.

In an alternative embodiment, coordinator devices 4 may be situated at fixed locations which are known beforehand. For instance, the fixed location could be operator infrastructure equipment deployed at known locations, such as cellular BTS, customer premises gateways etc. In such cases, the geolocation is not needed as the coordinator devices 4 do not move.

The location of connected objects 2 can be determined and tracked by merging the location information in multiple readings concerning a particular connected object 2 which are relayed by different CIoT reader devices 3.

In yet another embodiment, a plurality of coordinator devices 4 is provided, and the method according to the disclosure further comprises receiving a location of each connected object 2, receiving a list of each coordinator device 4, and identifying for each coordinator device 4 a number of connected objects 2 located within a broadcasting range of the respective coordinator device.

As mentioned, one or more coordinator devices 4 can be provided in the form of a fixed immovable structure. For example, one or more coordinator devices 4 can be in the form of stationary cell site. The backend cloud infrastructure 1 may generate a number of messages, said number of messages being equal to the number of coordinator devices communicating with the backend cloud infrastructure 1, wherein each message is associated to one selected coordinator device, and wherein each of said messages contains one separate fresh list of ID's of connected objects 2 located within the broadcasting range of the associated coordinator device 4. The number of messages is sent by the backend cloud infrastructure 1 to the respective stationary cell sites coordinator devices 4, preferably periodically.

In an embodiment, the backend cloud infrastructure 1 sends a message to each coordinator device 4, wherein said message contains a fresh list of ID's of all connected objects 2 for which the down-counter VP has not yet counted down to zero (or more generally for which the freshness indicator equals to "fresh"). Yet again, the message to each coordinator device 4 is preferably sent periodically.

Figure 4:
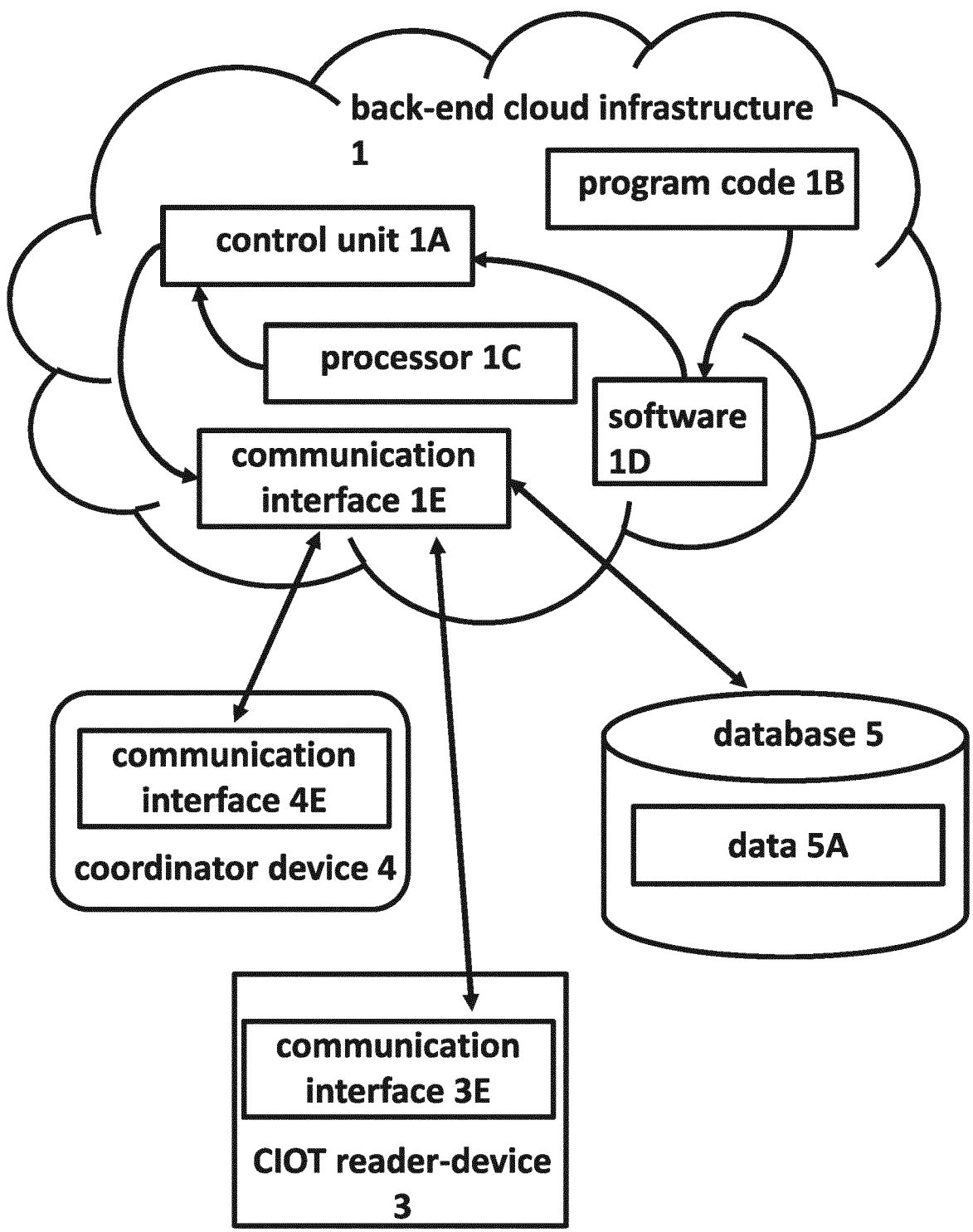
FIG. 4 is an example of a structure of the backend cloud infrastructure and its communication channels with the coordinator devices, and the CIoT reader devices.

FIG. 4 illustrates an exemplary implementation of the backend cloud infrastructure 1 according to the disclosure. The backend cloud infrastructure 1 may comprise program code 1B for example including instructions for creating the fresh list, instructions for setting the down-counter VP, instructions for distributing the fresh list to the coordinator devices, as well as "instructions 14" and "instructions 15" of FIG. 3. The backend cloud infrastructure 1 may comprise software 1D for implementing the program code 1B. The software 1D may be operated by a control unit 1A, which may be run by a processor 1C. The control unit 1A may further be in communication with a communication interface 1E responsible for communicating with a communication interface 4E of coordinator devices 4 and/or communication interface 3E of CIoT reader devices 3 via for example cellular and/or wifi connectivity. The backend cloud infrastructure 1 may further communicate with or directly comprise a database 5, which includes data 5A from the connected objects 2. The database may further include information such as the fresh list, identifier ID's of connected objects 2, initial values of the down-counter VP associated with each identifier ID, data related to location of coordinator devices 4 and/or CIoT reader devices 3 and/or connected objects 2, values of period P and interval I and other information.

In conclusion, as the CIoT reader devices 3 move around they collect data from connected objects 2 and send them to the backend cloud infrastructure 1. The backend cloud infrastructure computes (preferably periodically) at least one fresh list and distributes it to the coordinator devices 4 which broadcast the fresh list via BLE. The CIoT reader devices receive the fresh list and filter the transfer of the collected data accordingly by excluding transmission of data coming from connected objects 2 appearing on the fresh list so as to minimize redundant data sends.

The method and system of the disclosure is applicable in beacon based IoT applications, i.e., Bluetooth beaconing applications for beacon data collection and/or beacon device management and operation.

Following is a short summary of main components and their functionalities relevant for the present disclosure.

Glossary

CIoT: collaborative internet of "things"

Crowd: a set of people equipped by devices that can connect to a backbone network and tbc Connected object 2: the communicating "thing" of the internet of "things", for example a device such as a sensor, a beacon, etc.

CIoT reader device 3: a device under the responsibility of a crowd member that collects (reads) information broadcasted by the connected objects and then transfers this information to the backend cloud infrastructure Coordinator-device 4: a device that locally broadcasts via short range radio useful information for the coordination of the CIoT reader devices in order to optimize their collaboration efficiency Fresh list: a list of connected objects for which fresh (non-expired information) is available in the backend cloud infrastructure

The invention claimed is:

1. A method for redundancy control in decentralized crowd-based data collection network architecture, wherein a crowd of user equipment, termed "CIoT reader devices", act as collaborative IoT gateways for connected objects and collect received data from the connected objects and transmit at least some of the data to a backend cloud infrastructure, the method, implemented by a computer circuit of the backend cloud infrastructure, comprising:

assigning to each connected object an identifier ID and a freshness indicator, wherein the freshness indicator is a label having a value selected from one of "fresh" or "expired", upon receiving data from at least one connected object, setting the freshness indicator to the value of "fresh" for each respective connected object, wherein for each connected object the freshness indicator is configured to change its value to "expired" after expiry of a pre-determined period of time, and sending a message to at least one coordinator device, the message containing a list of ID's of at least one connected object for which the freshness indicator has the value of "fresh", termed "fresh list", wherein the coordinator device is configured to broadcast the fresh list to CIoT reader devices within a broadcasting range of the coordinator device, and wherein the CIoT reader devices are configured to exclude data from any connected object whose ID is appearing in the fresh list from being transmitted to the backend cloud infrastructure.

2. The method for redundancy control according to claim 1, further comprising:

sending instructions to each CIoT reader device to perform a Bernoulli trial with a predetermined success rate, and to send data collected from a connected object to the backend cloud infrastructure only if the outcome of the respective Bernoulli trial yields a positive result for the connected object.

3. The method for redundancy control according to claim 1 further comprising:

defining a redundancy level corresponding to a numerically expressed amount of redundant data received by the backend cloud infrastructure, upon determining that the amount of the redundant data has exceeded the redundancy level, identifying one or more of the connected objects as being the source of the redundant data, and identifying one or more of the CIoT reader devices which transmitted the redundant data from the identified connected objects to the backend cloud infrastructure.

4. The method for redundancy control according to claim 1, wherein a plurality of coordinator devices is provided, the method further comprising:

receiving a location of each connected object, generating a list of connected objects pertaining to a selected area, receiving a list of coordinator devices located in the selected area, identifying for each coordinator device a portion of the selected area covered by the respective coordinator device based on the broadcasting range of the respective coordinator device, and determining a combination of coordinator devices which cover the largest portion of the selected area.

5. The method for redundancy control according to claim 1, wherein a plurality of coordinator devices is provided, the method further comprising:

receiving a location of each connected object, receiving a list of each coordinator device, and identifying for each coordinator device a plurality of connected objects located within a broadcasting range of the respective coordinator device.

6. The method for redundancy control according to claim 5, wherein each coordinator device is positioned on a stationary cell site, wherein the method further comprises:

generating a plurality of messages, the number of messages being equal to the number of coordinator devices communicating with the backend cloud infrastructure, wherein each message is associated to a selected one coordinator device, and wherein each of the messages contains one separate fresh list of ID's of connected objects located within the broadcasting range of the associated coordinator device, and sending the plurality of messages to the respective coordinator devices.

7. The method for redundancy control according to claim 1, further comprising:

sending a message to each coordinator device, the message containing a fresh list of ID's of all connected objects for which the freshness indicator has the value of "fresh", wherein the message to each coordinator device is preferably sent periodically.

8. The method according to claim 1, wherein the CIoT reader device is at least one of a smartphone and a wife gateway.

9. The method according to claim 1, wherein the at least one coordinator device is chosen from among the CIoT reader devices.

10. The method according to claim 1, wherein the initial value of the pre-determined period of time is different for at least two connected objects, or is different for each connected object,
wherein the initial value of the pre-determined period of time is selected according to a type of payload data or delay tolerance of the connected object as defined by the backend cloud infrastructure.

11. The method according to claim 1, further comprising storing code instructions of a computer program comprising code instructions for performing the method, when these instructions are run by a processor.

12. A coordinator device for use in a method for redundancy control in decentralized crowd-based data collection network architecture, where a crowd of user equipment act as collaborative IoT gateways for connected objects and collect received data from the connected objects and transmit at least some of the data to a backend cloud infrastructure,
wherein the coordinator device exchanges data with the backend cloud infrastructure,
wherein the backend cloud infrastructure is configured to:
assign to each connected object an identifier ID and a freshness indicator, where the freshness indicator is a label having a value selected from one of "fresh" or "expired",
upon receiving data from at least one connected object, set the freshness indicator to the value of "fresh" for each respective connected object,
wherein for each connected object the freshness indicator is configured to change its value to "expired" after expiry of a pre-determined period of time,
wherein the coordinator device comprises a processing circuit configured to:
receive from the backend cloud infrastructure a list of ID's of at least one connected object for which the freshness indicator has the value of "fresh", termed "fresh list", and
broadcast the fresh list to an area defined by the broadcasting range of the coordinator device.

13. A user equipment acting as collaborative IoT reader device for use in a method for redundancy control in decentralized crowd-based data collection network architecture, where a crowd of user equipment act as collaborative IoT gateways for connected objects and collect received data from the connected objects and transmit at least some of the data to a backend cloud infrastructure,
wherein the user equipment exchanges data with the backend cloud infrastructure,
wherein the backend cloud infrastructure is configured to:
assign to each connected object an identifier ID and a freshness indicator,
where the freshness indicator is a label having a value selected from one of "fresh" or "expired",
upon receiving data from at least one connected object, set the freshness indicator to the value of "fresh" for each respective connected object,
wherein for each connected object the freshness indicator is configured to change its value to "expired" after expiry of a pre-determined period of time,
wherein the user equipment comprises a processing circuit configured to:
receive a list of ID's of at least one connected object for which the freshness indicator has the value of "fresh", termed "fresh list" from a coordinator device,
read the identifier ID's of the connected objects included in the fresh list, and
exclude the data received from the connected objects contained in the fresh list from being transmitted to the backend cloud infrastructure.

* * * * *